(12) United States Patent
Sherburne et al.

(10) Patent No.: US 10,798,233 B2
(45) Date of Patent: Oct. 6, 2020

(54) MOBILE PHONE STATION

(71) Applicant: Plantronics, Inc., Santa Cruz, CA (US)

(72) Inventors: Philip Sherburne, Morgan Hill, CA (US); John B Ledingham, Scotts Valley, CA (US); Jacob T Meyberg Guzman, Santa Cruz, CA (US); Brent John Thorington, Santa Cruz, CA (US); John Gary Mihelic, Santa Cruz, CA (US); Michael David Rhoads, Scotts Valley, CA (US); Robert Benjamin Foster, Eagle, ID (US); David Andrew Sauerhaft, Los Altos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 16/298,779

(22) Filed: Mar. 11, 2019

(65) Prior Publication Data

US 2019/0281147 A1 Sep. 12, 2019

Related U.S. Application Data

(60) Provisional application No. 62/641,384, filed on Mar. 11, 2018.

(51) Int. Cl.
*H04M 1/04* (2006.01)
*H02J 50/10* (2016.01)
(Continued)

(52) U.S. Cl.
CPC .............. *H04M 1/04* (2013.01); *H02J 50/10* (2016.02); *H04M 1/215* (2013.01); *H04M 1/725* (2013.01)

(58) Field of Classification Search
None
See application file for complete search history.

(56) References Cited

U.S. PATENT DOCUMENTS 5,526,403 A 6/1996 Tam
5,715,296 A 2/1998 Schornack et al.
(Continued)

FOREIGN PATENT DOCUMENTS

EP 0843491 A2 5/1998
WO WO-2012/076782 A1 6/2012

OTHER PUBLICATIONS

Unknown, "Azpen—DockAll Universal Docking Station for Smartphones and Tablets," found on Mar. 5, 2018 at URL https://www.bestbuy.com/site/azpen-dockall-universal-docking-station-for-smartphones-and-tablets/5809012.p?skuId=5809012, 2 pages.

(Continued)

*Primary Examiner* — Quoc D Tran

(57) ABSTRACT

A mobile phone stations is disclosed. In general, in one aspect, the mobile phone station connects to a smartphone for sending and receiving data therebetween. Further, the mobile phone station includes a dial pad for placing outgoing calls via the smartphone and answering incoming calls received at the smartphone. Also, the mobile phone station includes a charging mechanism for charging the smartphone. In use during an active call at the smartphone, the mobile phone station allows a user to seamlessly switch between two or more of a handset, a speakerphone, and a headset without requiring any user interaction with the smartphone.

17 Claims, 9 Drawing Sheets

(51) Int. Cl.
*H04M 1/725* (2006.01)
*H04M 1/215* (2006.01)

(56) References Cited

U.S. PATENT DOCUMENTS

| | | | |
|---|---|---|---|
| 6,073,031 A | 6/2000 | Helstab et al. | |
| 6,704,580 B1 | 3/2004 | Fintel | |
| 6,766,175 B2 | 7/2004 | Uchiyama | |
| 6,937,854 B2 | 8/2005 | Janssen et al. | |
| 6,987,988 B2 | 1/2006 | Uchiyama | |
| 7,565,115 B2 | 7/2009 | Alexis | |
| 7,751,852 B2 | 7/2010 | Kavounas | |
| 8,805,456 B1* | 8/2014 | Hardy | H02J 7/025 455/573 |
| 9,729,689 B2 | 8/2017 | Jakobsen et al. | |
| 10,404,846 B1* | 9/2019 | Shipman, Jr. | H04M 1/0256 |
| 10,455,067 B1* | 10/2019 | Meyberg Guzman | A45F 5/102 |
| 2003/0157929 A1 | 8/2003 | Janssen et al. | |
| 2011/0300900 A1* | 12/2011 | Fleming | H04M 1/04 455/555 |
| 2011/0306393 A1* | 12/2011 | Goldman | H04M 1/6066 455/575.2 |
| 2013/0219098 A1* | 8/2013 | Turnpenny | H04M 1/04 710/303 |
| 2014/0295758 A1* | 10/2014 | Pedersen | G06F 1/1632 455/41.2 |
| 2017/0329366 A1 | 11/2017 | Hassan et al. | |
| 2018/0069964 A1* | 3/2018 | Koreis | H04M 7/009 |
| 2018/0084588 A1 | 3/2018 | Khoury et al. | |

OTHER PUBLICATIONS

Unknown, "5 Handset Connect to Cell™ Phone System with Cordless Headset," found on Dec. 19, 2017 at URL https://www.vtechphones.com/store/pd/3031/DS6673-6C-5-Handset-Connect-to-Cell-Phone-System-with-Cordless-Headset, 5 pages.

Unknown, invoxia, "NVX 200 User Manual," found on Mar. 5, 2018 at URL https://invoxia.zendesk.com/hc/en-us/article_attachments/115009510465/NVX_200_User_Guide_05-2017.pdf, 14 pages.

Unknown, "NVX200 Invoxia Bluetooth Speaker Phone The sound of your conferences," found on Mar. 5, 2018 at URL https://www.invoxia.com/us/en/bluetooth-speakerphone/nvx-200, 4 pages.

Unknown, "vtech® Complete user's manual www.vtechphones.com, Models: DS6671-2/DS6671-3/DS6671-4;DS6672-4" dated Jul. 2013, found at URL https://www.manualslib.com/manual/706817/Vtech-Ds6671-2.html, 110 pages.

* cited by examiner

MOBILE PHONE STATION

CROSS-REFERENCE TO RELATED APPLICATIONS

This application claims benefit of U.S. Provisional Patent Application Ser. No. 62/641,384 titled "Mobile Phone Station," filed Mar. 11, 2018, the disclosure thereof incorporated by reference herein in its entirety.

FIELD

The present disclosure relates generally to the field of desk-based telephone hardware. More particularly, the present disclosure relates to a mobile phone station.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Since the turn of the twenty-first century, the telecommunications industry has experienced several significant shifts. First, around the year 2000, Voice over Internet Protocol (VoIP) technology began its push into the corporate environment, reducing corporate reliance on Time Division Multiplexed (TDM) private branch exchange systems, and moving voice traffic to data networks. Second, around the year 2003, with corporate LANs becoming more robust, VoIP software clients (i.e., softphones) started making their way onto corporate computers, allowing users to make and receive phone calls using their work phone number from anywhere in the world, and decreasing corporate reliance on physical desk-installed telephones (i.e., desk phones). Third, in the year 2007, the world was introduced to the first "smartphone"—a cellular-connected mobile phone with high-speed Internet access, usually including a touchscreen interface, that can obviate the need for a desktop or laptop computer by way of user-installable applications executable on the device. Since 2007, major cellular providers have expended considerable capital improving the coverage areas of their cellular and data networks. As a result, smartphone users have nearly uninterrupted wireless broadband access wherever they are, especially when in metropolitan areas. Due to the expansion and reliability of these cellular networks, smartphones have quickly become a primary device for work communications, including email, messaging, VoIP calls, and cellular phone calls. Unfortunately, however, smartphones lack the capabilities and features demanded by many desk-based workers. For example, the generally rectangular brick conformation converged upon by today's smartphone manufacturers is uncomfortable to hold against a user's ear for any significant amount of time. Additionally, the speakerphones present in today's smartphones include microphones sensitive to environmental noise, and have limited output volume. Also, for power users accustomed to a dial pad with physical buttons, the touchscreen interface of modern smartphones can make it difficult to quickly dial outgoing calls. Still yet, smartphones are prone to rapidly depleting their battery power, especially when constantly used. Accordingly, heavy smartphone users are constantly concerned with keeping their device charged.

SUMMARY

In general, embodiments of a mobile phone station are shown and described below.

The details of one or more implementations are set forth in the accompanying drawings and the description below. Other features will be apparent from the description and drawings, and from the claims.

DETAILED DESCRIPTION

Figure 1:
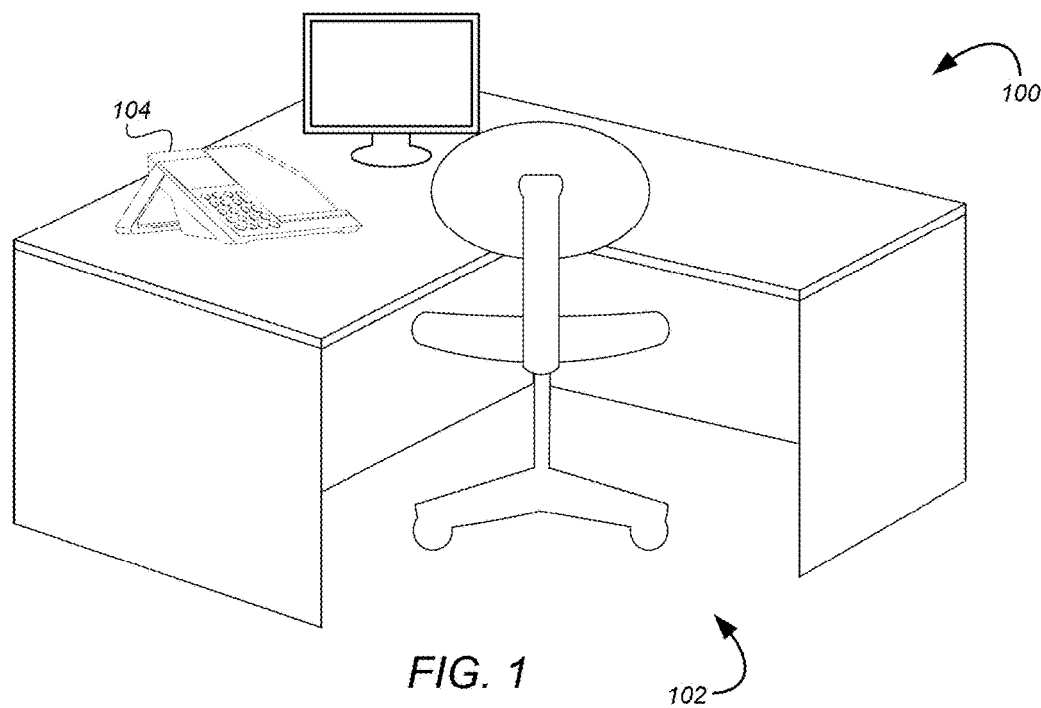
FIG. 1 depicts an environment for a mobile phone station, in accordance with one or more embodiments of the invention.

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named the elements. For example, a first element is distinct from a second element, and the first element may encompass more than one element and succeed (or precede) the second element in an ordering of elements.

Due to the evolution of robust, high-speed cellular networks, nearly every worker in a metropolitan area now carries a smartphone. As a result, it has become commonplace to use smartphones in a manner that replaces the role of both a traditional desk phone as well as a softphone client on a laptop or desktop computer, including for video or web conferencing. Although quite capable, smartphones are not ideal replacements for either desk phones or softphone clients executing on more capable personal computers. For example, due to their form factor, smartphones are generally uncomfortable to hold against an ear for any significant period of time, and cannot achieve the audio quality or volume of traditional desk-based speakerphone hardware. Also, without a dedicated dial pad that is always accessible and provides tactile feedback, it can be difficult to rapidly dial phone numbers to make outgoing calls on a smartphone. Further, for a user that relies on their smartphone throughout the workday, their smartphone's battery level is a constant concern.

In general, embodiments of the invention provide a mobile phone station that makes a user's smartphone a more capable telecommunications device, especially in business environments. In particular, embodiments of the mobile phone station disclosed herein provide a smartphone with a dedicated dial pad for placing outgoing calls via the smartphone. Also, embodiments of the mobile phone station disclosed herein include charging mechanisms that ensure the smartphone battery is not depleted after a day of constant use. Furthermore, the mobile phone station disclosed herein allows a user to seamlessly switch between a handset, speakerphone, and headset when making and receiving phone calls. Still yet, the mobile phone station disclosed herein provides a user with direct and immediate access to content on their smartphone without the user even touching their smartphone. In sum, the mobile phone station disclosed herein cements the role of a smartphone as a single device to meet a user's communication needs both outside and inside the office.

FIG. 1 shows an environment 100 in which is installed a mobile phone station, according to one or more embodiments. Although the elements of the environment 100 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 1 may be omitted, repeated, and/or substituted. Accordingly, various embodiments may lack one or more of the features shown. For this reason, embodiments of the invention should not be considered limited to the specific arrangements of elements shown in FIG. 1.

As depicted in FIG. 1, the environment 100 includes a workstation 102. As used herein, the workstation 102 includes any workspace in which a person (i.e., a user, an individual, etc.) may engage in one or more tasks. The workstation 102 may include, for example, a desk, a cubicle, a conference room, a hoteling or hot-desking space, and/or an office.

As shown in FIG. 1, a mobile phone station 104 is installed at the workstation 102. As described herein, the mobile phone station 104 connects to a user's smartphone to provide the user with a telecommunications experience that extends beyond the acoustic and user interface limits inherent to the smartphone. In particular, and as described in further detail below, the mobile phone station 104 allows a user at the workstation 102 to make outgoing calls using a dial pad, rapidly join web conferences and meetings, and seamlessly transition between headset, speakerphone, and handset audio endpoints, all while charging the smartphone. Accordingly, the mobile phone station 104 may obviate the user's need for a network-connected desk phone at the workstation 102. Also, the mobile phone station 104 may obviate the need for a softphone client executing on a laptop or desktop computer at the workstation 102.

Figure 2:
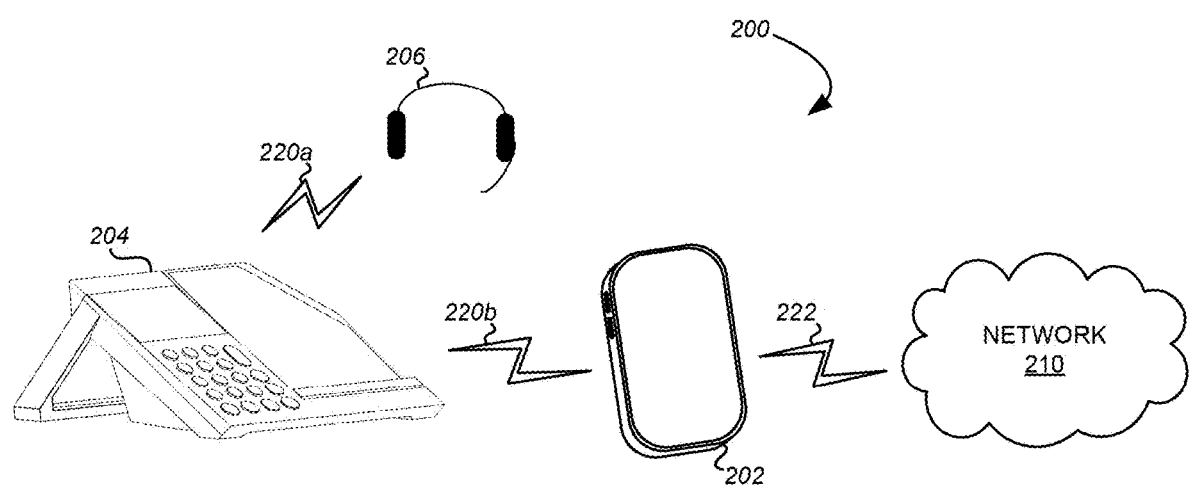
FIG. 2 depicts a system including a mobile phone station, in accordance with one or more embodiments of the invention.

FIG. 2 depicts a system 200 including a mobile phone station, according to one or more embodiments. Although the elements of the system 200 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 2 may be omitted, repeated, and/or substituted. Accordingly, various embodiments may lack one or more of the features shown. For this reason, embodiments of the invention should not be considered limited to the specific arrangements of elements shown in FIG. 2.

As shown in FIG. 2, the system 200 includes a mobile phone station 204 in communication, over a first communications link 220*a*, with a headset 206. Also, the system 200 includes a smartphone 202 in communication, over a second communications link 220*b*, with the mobile phone station 204. Finally, the smartphone 202 is depicted as being in communication, over a third communications link 222, with a network 210. The mobile phone station 204 may be substantially identical to the mobile phone station 104, described above in the context of FIG. 1.

As described herein, the smartphone 202 includes any cellular network-connected mobile phone with high-speed Internet access, to which one or more applications may be installed. The high-speed Internet may be accessible over a local area network (LAN), such as an IEEE 802.11 network (WLAN), and/or over a broadband cellular network (e.g., 3G, 4G, 4G LTE, 5G, etc.). Accordingly, as described herein, the third communications link 222 between the smartphone 202 and the network 210 is generally understood to include wireless link, but may include other suitable link types. In one or more embodiments, the smartphone 202 may include a touchscreen interface and/or biometric security mechanism.

As described herein, the network 210 includes any private and/or public communications network, wired and/or wireless, such as a LAN, wide area network (WAN), and/or the Internet. The network 210 may support standards such as Ethernet, wireless fidelity (Wi-Fi), etc., and may be used by the smartphone 202 for communicating (e.g., phone calls, video calls, web conferences, instant messaging, email communications, etc.) with the other devices coupled to the network 210.

As described herein, the headset 206 may include any body-worn device configured to include, when worn, a speaker proximate to an ear of a wearing user, and a microphone for monitoring the speech of the user. Accordingly, the headset 206 may include a monaural headset or stereo headset, whether worn by a user over-the-ear (e.g., circumaural headphones, etc.), in-ear (e.g., earbuds, earphones, neck-worn devices, etc.), or on-ear (e.g., supraaural headphones, etc.). The headset 206 may be utilized by the user to participate in telephone calls made from and received at the smartphone 202, as described below.

The first communications link 220*a* between the mobile phone station 204 and the headset 206 may be wired or wireless. For example, in one or more embodiments, the first communications link 220*a* may include a Universal Serial Bus (USB) connection. In one or more embodiments, the communications link 220*a* may include a wireless connection. For example, the first communications link 220*a* may include a Wi-Fi, a Bluetooth, a Digital Enhanced Cordless Telecommunications (DECT), or a ZigBee connection. As another example, the first communications link 220a may include a near-field communication (NFC) connection or Bluetooth Low Energy connection. Accordingly, the first communications link 220a may be formed by tapping the headset 206 against the mobile phone station 204, or by otherwise placing the two devices in close proximity.

The second communications link 220b between the mobile phone station 204 and the smartphone 202 may be wired or wireless. For example, in one or more embodiments, the second communications link 220b may include a USB connection. In one or more embodiments, the second communications link 220b may include a wireless connection. For example, the second communications link 220b may include a Wi-Fi, a Bluetooth, a Digital Enhanced Cordless Telecommunications (DECT), or a ZigBee connection. As another example, the second communications link 220b may include a NFC connection or Bluetooth Low Energy connection. Accordingly, the second communications link 220b may be formed by tapping the smartphone 202 against the mobile phone station 204, or by otherwise placing the two devices in close proximity.

In one or more embodiments, the smartphone 202 may include stored thereon a softphone application (i.e., softphone client) executable by the smartphone 202. As described herein, a softphone client includes any application on the smartphone 202 that enables a user of the smartphone 202 to send and receive voice communications over an Internet Protocol (IP) network, also referred to herein as VoIP communications (e.g., VoIP calls, etc.), using the smartphone 202. The softphone client may support, for example, one or more of Session Initiation Protocol (SIP), H.323, Media Gateway Control Protocol (MGCP), Real-time Transport Protocol (RTP), Real-time Transport Control Protocol (RTCP), Secure Real-time Transport Protocol (SRTP), Session Description Protocol (SDP), and Inter-Asterisk eXchange (IAX) protocol. Examples of commercially available softphone clients include Skype® and Microsoft Teams, both offered by Microsoft Corporation. In one or more embodiments, the smartphone 202 may include stored thereon an application executable by the smartphone 202 for making and receiving calls over a cellular network (e.g., a Global System for Mobile Communications (GSM) network, code-division multiple access (CDMA) network, etc.). VoIP communications received using a softphone client on the smartphone 202 and voice communications received using an application that accesses the cellular network may be together herein referred to as "calls."

In use, any of a speakerphone (not shown) of the mobile phone station 204, a handset (not shown) of the mobile phone station 204, or the headset 206 may be used as a call audio endpoint for calls outgoing from and incoming to the smartphone 202, as described below. Accordingly, call audio received from a far end caller via the network 210 may be routed from the smartphone 202 to the mobile phone station 204 over the second communications link 220b, and then over the first communications link 220a to the headset 206. In the opposite direction, call audio received from a near end caller may be received at the headset 206, transmitted to the mobile phone station 204 over the first communications link 220a, and then to the smartphone 202 over the second communications link 202b for routing to the far end caller over the network 210. Of course, however, a handset or speakerphone at the mobile phone station 204 may be used in lieu of the headset 206. By routing all call audio through the mobile phone station 204, the active call audio endpoints may be switched without interrupting the active call.

Figure 3A:
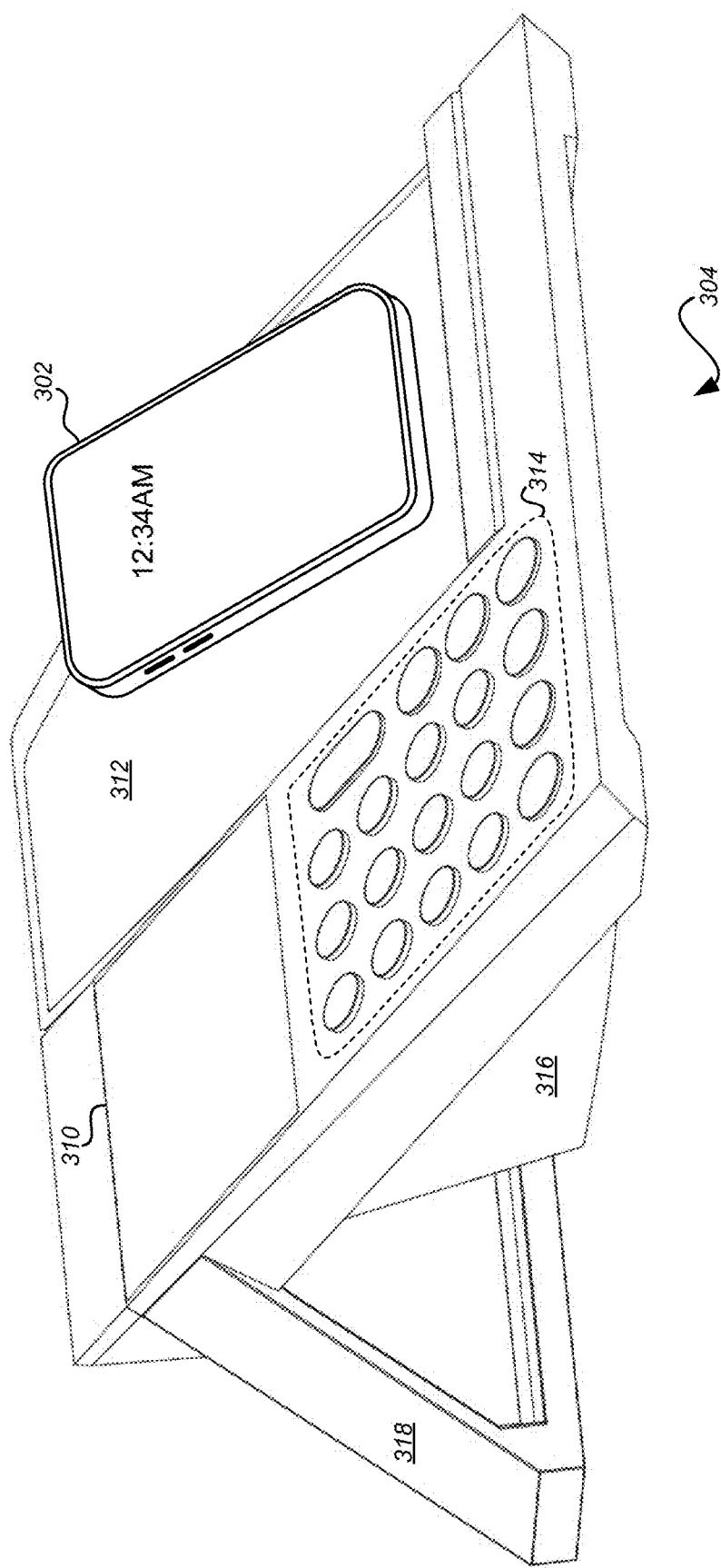
FIGS. 3A-3C show various views of a mobile phone station, in accordance with one or more embodiments of the invention.
Figure 3B:
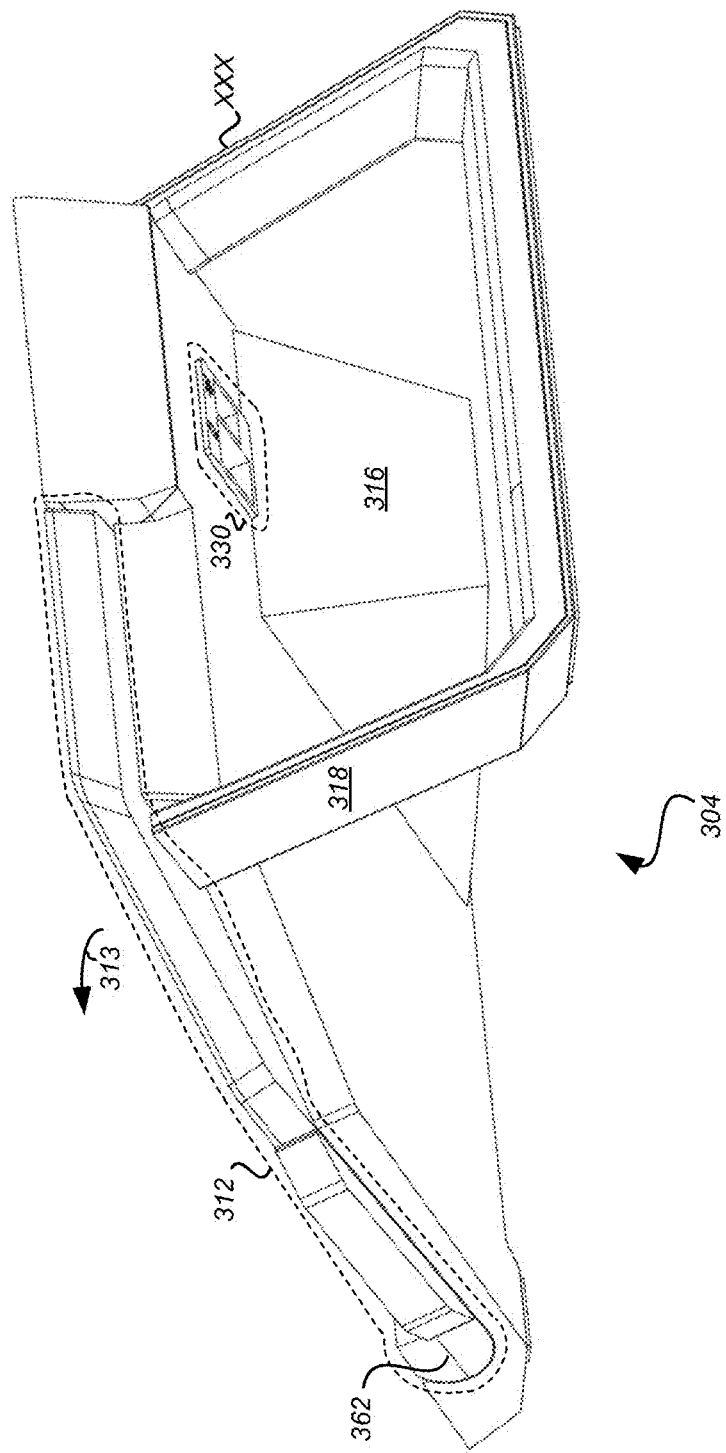
Figure 3C:
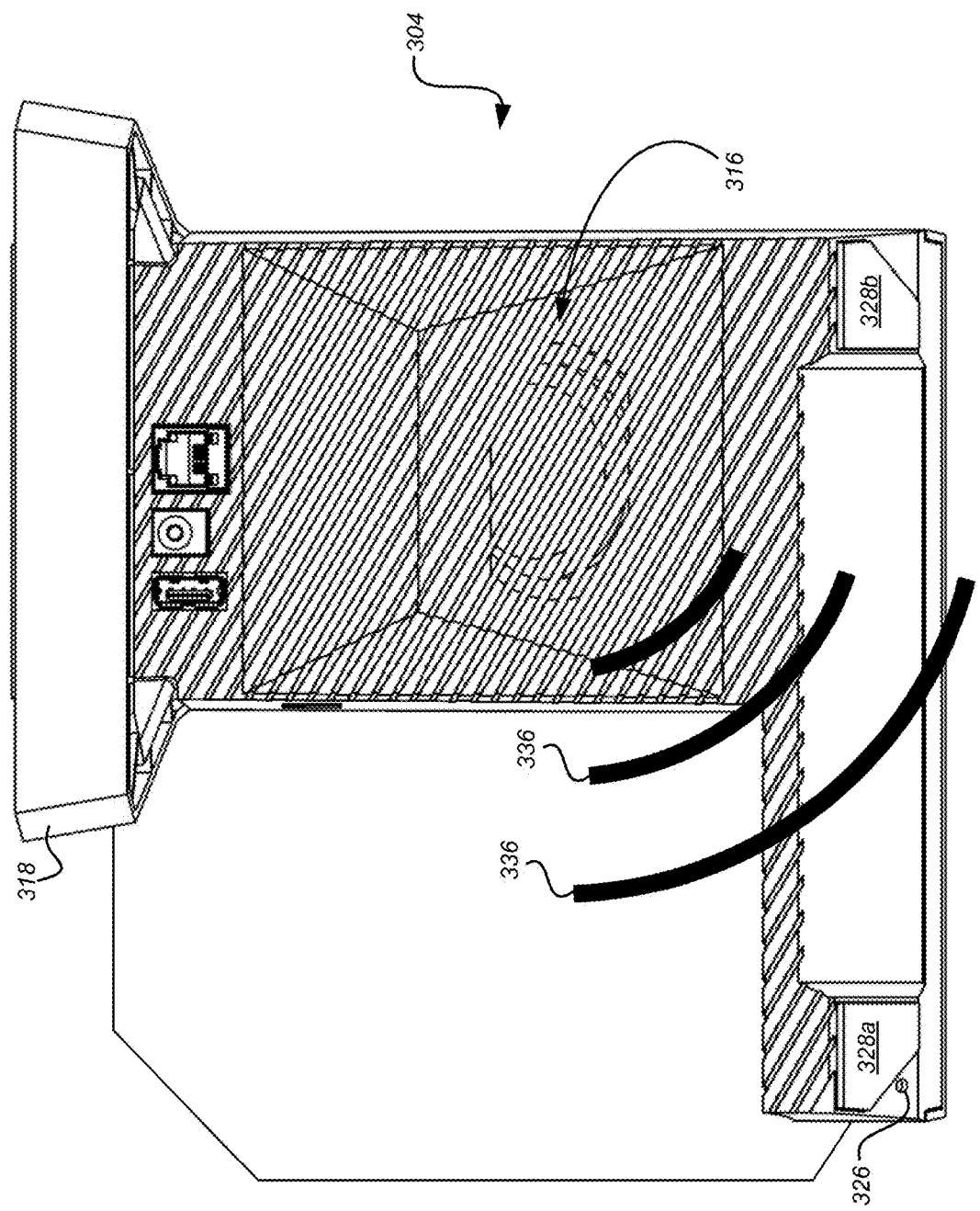

FIGS. 3A-3C show various views of a mobile phone station 304, in accordance with one or more embodiments of the invention. Although the elements of the mobile phone station 304 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIGS. 3A, 3B, and 3C may be omitted, repeated, and/or substituted. Accordingly, various embodiments may lack one or more of the features shown. For this reason, embodiments of the invention should not be considered limited to the specific arrangements of elements shown in FIGS. 3A, 3B, and 3C.

FIG. 3A shows a front perspective view of a mobile phone station 304; FIG. 3B shows a rear perspective view of the mobile phone station 304; and FIG. 3C shows a bottom view of the mobile phone station 304. The mobile phone station 304 may be substantially identical to the mobile phone station 204, described above in reference to FIG. 2. As shown in FIGS. 3A and 3B, the mobile phone station 304 includes a display 310, a pivoting platform 312, one or more user-operable controls 314, a loudspeaker 316, and a stand 318. Referring still to FIG. 3A, a smartphone 302 is shown resting on the pivoting platform 312. The smartphone 302 may be in communication, either wired or wirelessly, with the mobile phone station 304. Referring to FIG. 3B, the mobile phone station 304 is also shown to include one or more connectors 330.

The connectors 330 may include a power plug for providing electrical power to the mobile phone station 304. The connectors 330 may include a USB port for connecting a wired headset to the mobile phone station 304. The connectors 330 may include a USB port for connecting a flash memory device containing firmware for installation on the mobile phone station 304. The connectors 330 may include a USB port for connecting a smartphone to the mobile phone station 304.

As described herein, the display 310 includes any element that outputs a visual representation of a state of the mobile phone station 304, a connected headset (e.g., headset 206 of FIG. 2, etc.) and/or the smartphone 302. For example, the display 310 may visually indicate one or more of: whether the smartphone 302 is currently connected to the mobile phone station 304, a battery level of the smartphone 302, a call status of the smartphone 302, a cellular signal strength of the smartphone 302, a name of the smartphone 302, a WLAN connection state of the smartphone 302, a softphone client presence state, a call forward state, a conference state, a call duration, a call log, and a call hold state. As further examples, the display 310 may visually indicate one or more of: whether a headset is currently connected to the mobile phone station 304, a charge state of the headset (e.g., charging, etc.), and a battery level of the headset. Still further, the display 310 may be used to indicate one or more of: caller identification of an incoming call to the smartphone 302, a current date, a current time, and a currently selected line out. The display 310 may provide information for configuring and/or troubleshooting the mobile phone station 304. In one or more embodiments, the display 310 may include a light emitting diode (LED) or liquid-crystal display (LCD) color display.

Now referring to FIG. 3B, the pivoting platform 312 rotates about a lower hinge 362 in the direction of an arrow 313 to allow adjustment of a user's viewing angle of the smartphone 302. In this way, the user's viewing angle of the smartphone 302 may be adjusted, as needed, for operating applications on the smartphone 302, engaging in video calls on the smartphone 302, observing web conferences at the smartphone 302, etc. In one or more embodiments, the pivoting platform 312 may rotate approximately 45 degrees about the lower hinge 362. For example, the pivoting platform 312 may rotate from approximately 30 degrees to approximately 75 degrees relative to the surface on which the mobile phone station 304 is resting. In one or more embodiments, the pivoting platform 312 may include a male connector (e.g., Lightning connector, micro-USB connector, etc.) for inserting into a receptacle of the smartphone 302. As an option, the pivoting platform 312 may include one or more induction coils for wirelessly charging the smartphone 302 while it rests on the pivoting platform 312. Accordingly, the mobile phone station 304 may facilitate continuous charging of the smartphone 302 throughout a user's workday.

The one or more user-operable controls 314 include any number of buttons, slide switches, capacitive sensors, and/or touch screens. In one or more embodiments, the user-operable controls 314 may include a numeric dial pad, a volume control, application-specific invocation button, and a voice skills button. In one or more embodiments, the user-operable controls 314 of the mobile phone station 304 may include one or more softkeys. A softkey includes any button that may be dynamically programmed to invoke distinct functions, instead of being statically programmed to invoke a single function. The function associated with a softkey may change depending on a state of the mobile phone station 304, the smartphone 302, and/or a connected headset (not shown). In one or more embodiments, the user-operable controls 314 of the mobile phone station 304 may include one or more touchscreen devices. Accordingly, the display 310 may comprise a touchscreen display.

Figure 7:
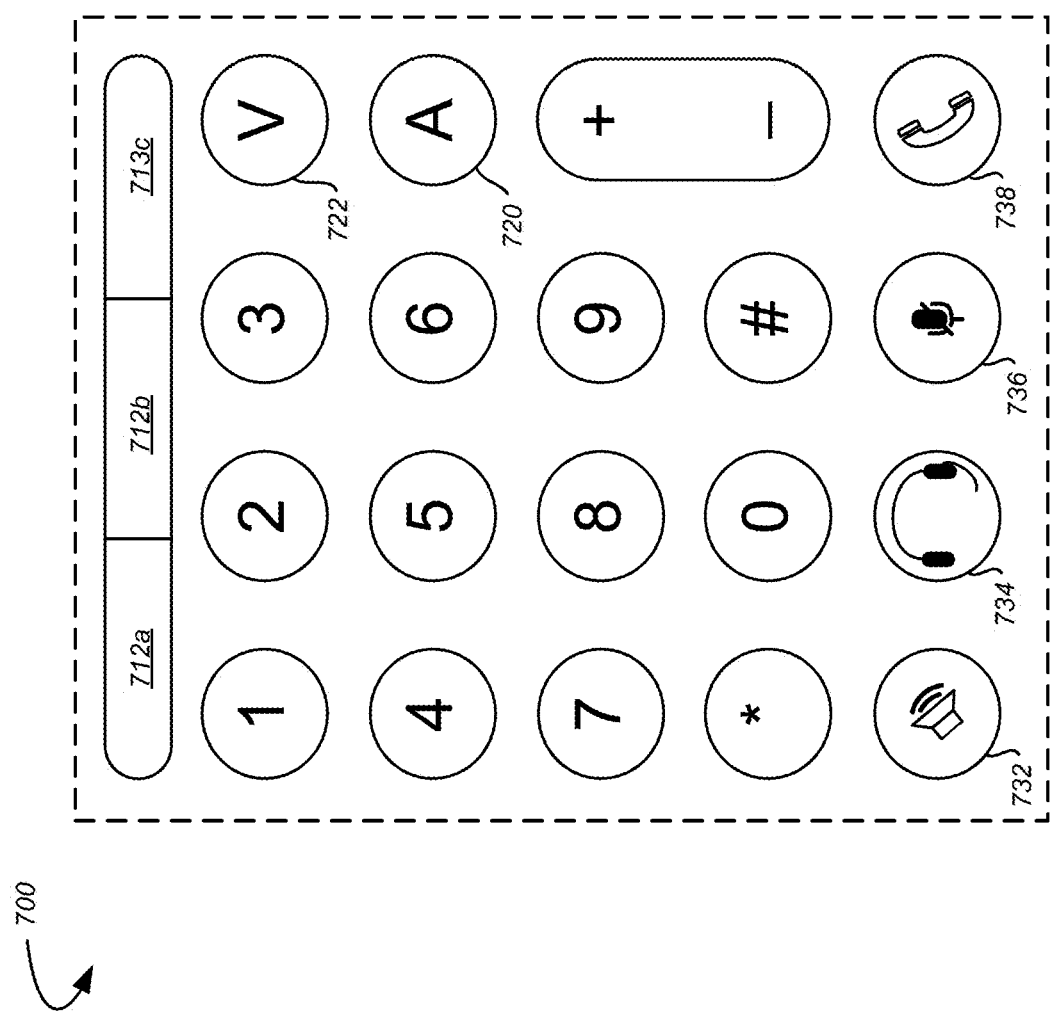
FIG. 7 depicts an example of user-operable controls of a mobile phone station, in accordance with one or more embodiments of the invention.

By way of example, FIG. 7 depicts an example of user-operable controls 700 of a mobile phone station, in accordance with one or more embodiments of the invention. Although the elements of the user-operable controls 700 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 7 may be omitted, repeated, and/or substituted. Accordingly, various embodiments may lack one or more of the features shown. For this reason, embodiments of the invention should not be considered limited to the specific arrangements of elements shown in FIG. 7.

As shown in FIG. 7, the user-operable controls 700 include a standard dial pad (i.e., numerals 0-9, *, and #). Also, the user-operable controls 700 include volume adjustment buttons (i.e., +, −). Moreover, the user-operable controls 700 include a mute button 736, as well as a call button 738 that may be used to initiate calls, answer calls, and/or end calls. The user-operable controls 700 may include a hold button to place a call on hold and remove the call from hold. Furthermore, the user-operable controls 700 include a speakerphone button 732 for selecting a speakerphone as the active call audio endpoint, and a headset button 734 for selecting a connected headset as the active call audio endpoint. Still referring to FIG. 7, the user-operable controls 700 include an application-specific invocation button 720. The application-specific invocation button 720, when operated by a user, may invoke a predetermined application installed on a connected smartphone (e.g., smartphone 302, etc.). Such an application may include, for example, a softphone client, instant messaging application, or phone book. Also, in one or more embodiments, the user-operable controls 700 may include a voice skills button 722. Activation of the voice skills button 722 may invoke a predetermined voice assistant of a connected smartphone (e.g., smartphone 302, etc.). Examples of commercially available voice assistants include the Siri® voice assistant from Apple Inc., and the Cortana® voice assistant from Microsoft Corporation.

Still referring to FIG. 7, the user-operable controls 700 are shown to include softkeys 712. More specifically, the user-operable controls 700 are shown to include a first softkey 712a, a second softkey 712b, and a third softkey 712c. Although three softkeys 712 are shown in FIG. 7, it is understood that the user-operable controls 314 of the mobile phone station 304 of FIGS. 3A-3C may include any number of softkeys.

Figure 8A:
FIGS. 8A and 8B depict an example of a line out toggle of a mobile phone station, in accordance with one or more embodiments of the invention.
Figure 8B:
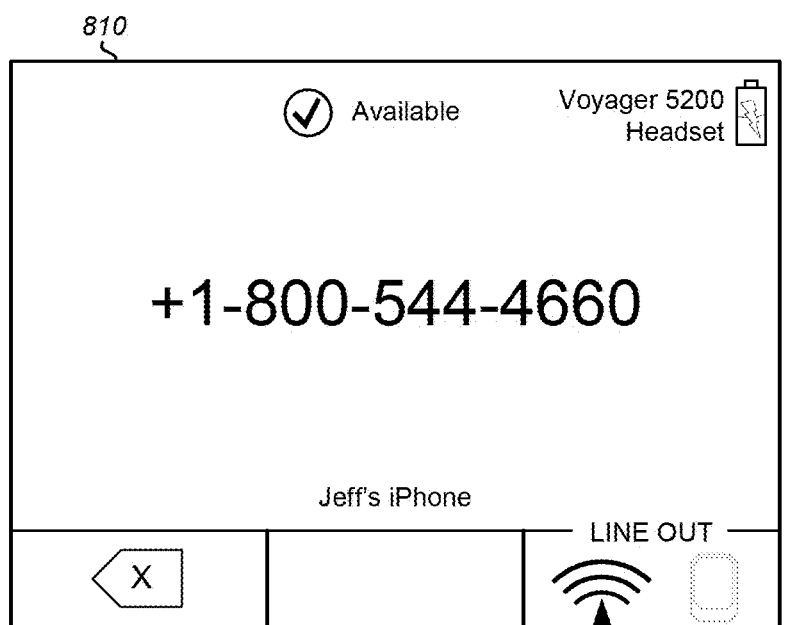

In one or more embodiments, one of the softkeys 712 may be used to toggle a line out selection when both a VoIP softphone and cellular network are available for outgoing calls from a connected smartphone. Each of these calling methods may be associated with a different telephone number. FIGS. 8A and 8B depict an example of a line out toggle of a mobile phone station, in accordance with one or more embodiments of the invention. Although the elements of FIGS. 8A and 8B are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIGS. 8A and 8B may be omitted, repeated, and/or substituted. Accordingly, various embodiments may lack one or more of the features shown. For this reason, embodiments of the invention should not be considered limited to the specific arrangements of elements shown in FIGS. 8A and 8B.

FIGS. 8A and 8B both provide detailed views of a display 810 of a mobile phone station, such as the mobile phone station 304 of FIGS. 3A-3C. Accordingly, the display 810 may be substantially identical to the display 310, described above in the context of FIG. 3A. As shown in FIG. 8, the display 810 indicates that the mobile phone station is presently connected to a user's smartphone (i.e., "Jeff's iPhone"). The display 810 indicates the presence state (i.e., "Available"), of a user of the mobile phone station, on a softphone client executing on the smartphone. The display 810 indicates that a wireless Bluetooth headset (i.e., "Voyager 5200 Headset") is presently connected to the mobile phone station. Also, the display 810 indicates a battery level (i.e., approximately 50%) of the wireless Bluetooth headset.

By way of user-operable controls at the mobile phone station, such as a dial pad, the user has dialed a phone number (i.e., 1-800-544-4660) to place an outgoing call. The dialed phone number may be sent to the connected smartphone once the user presses, for example, one of the buttons 732, 734, or 738, described above in reference to FIG. 7. Further, the dialed phone number may be sent to the connected smartphone once the user lifts a handset at the mobile phone station, or removes the wireless Bluetooth headset from its cradle. The dialed phone number may be conveyed to the smartphone in a message that also indicates an outgoing call method. The outgoing call method may be selected by the user at any time prior to the message being conveyed to the smartphone. For example, the outgoing call method may be selected by the user prior to entering the phone number, while entering the phone number, or after entering the phone number.

In FIGS. 8A and 8B, the currently selected outgoing call method is shown in the lower right corner (i.e., "LINE OUT") of the display 810. Specifically, as illustrated by FIGS. 8A and 8B, the user may toggle between a first display element 832 indicating use of a cellular network for placing the outgoing call, or a second display element 834 indicating use of a softphone client for placing the outgoing call. A user may toggle between the selection of the display elements 832 and 834 using a softkey, such as, for example, the third softkey 713c of FIG. 7. More specifically, when the display 810 of the mobile phone station indicates that the selected outgoing call method is over a cellular telephone network (i.e., as shown in FIG. 8A), pressing the third softkey 713c may cause the display 810 of the mobile phone station to transition to a second state indicating that the selected outgoing call method is now a softphone client (i.e., as shown in FIG. 8B).

Accordingly, when the mobile phone station sends a dial out message to the connected smartphone and the display 810 indicates that the first display element 832 is selected, the message may indicate a cellular network call method, and the smartphone may pass the phone number to an application for placing calls on a cellular network. However, when the mobile phone station sends a dial out message to the connected smartphone and the display 810 indicates that the second display element 834 is selected, the message may indicate a softphone client call method, and the smartphone may pass the phone number to a softphone client for placing the outgoing call. The outgoing call may proceed over either Wi-Fi or a cellular data network. Although the line out selection functionality has been described as provided by a softkey, it is contemplated that, in one or more embodiments, a dedicated button, switch, or other control may be used for selecting an outgoing call method.

Returning to FIGS. 3A-3C, the mobile phone station 304 is shown to include a loudspeaker 316. The loudspeaker 316 may include a driver between 30-70 mm in diameter. For example, the loudspeaker 316 may be approximately 50 mm in diameter. Although the loudspeaker 316 is shown to be downward firing, it is contemplated that the loudspeaker 316 may be configured to have any suitable directionality. The loudspeaker 316 may be used to output an audible ringtone into the environment to alert a user of an incoming call. The loudspeaker 316 may be included for use in a speakerphone, to output received call audio. Accordingly, in one or more embodiments, the mobile phone station 304 may include a microphone.

By way of a more specific example, and referring to FIG. 3C, the mobile phone station 304 is shown to include a microphone 326. The microphone 326 is located on a bottom of the mobile phone station 304. Attached to the bottom of the mobile phone station 304 are one or more feet 328 (i.e., a first foot 328a, a second foot 328b). The feet 328 are configured to contact a surface upon which the mobile phone station 304 rests. The feet 328 may comprise an elastomeric material (e.g., silicone, rubber, etc.). Thus, the feet 328 may be made from a material having acoustic damping characteristics. At least one of the feet 328 may be arranged on the bottom of the mobile phone station 304 in a manner that reduces the amplitude of sound output 336 from the loudspeaker 316 that is directly received at the microphone 326. In particular, and still referring to FIG. 3C, the first foot 328a is configured to shield the microphone 326 from directly receiving the sound output 336 of the loudspeaker 316. More specifically, the first foot 328a is an irregular polygon with an outer side configured to be generally parallel to a nearest edge of the driver of the loudspeaker 316. Further, the microphone is disposed adjacent to the outer side of the first foot 328a to partially isolate the microphone 326 from the sound output 336 of the loudspeaker 316. Although the microphone 326 and the loudspeaker 316 are shown in one arrangement in FIGS. 3A-3C, it is contemplated that such elements may be arranged in any suitable manner. For example, in one or more embodiments of the mobile phone station, a microphone may be located on a top of the device. Further, in one or more embodiments, a mobile phone station may include two or more microphones.

With continued reference to FIGS. 3A-3C, the mobile phone station 304 includes a stand 318. The stand 318 generally supports the back of the mobile phone station 304 on a desk, or other suitable surface. A bottom of the stand 318 (visible in FIG. 3C) may include an elastomeric material (e.g., silicone, rubber, etc.).

Figure 4:
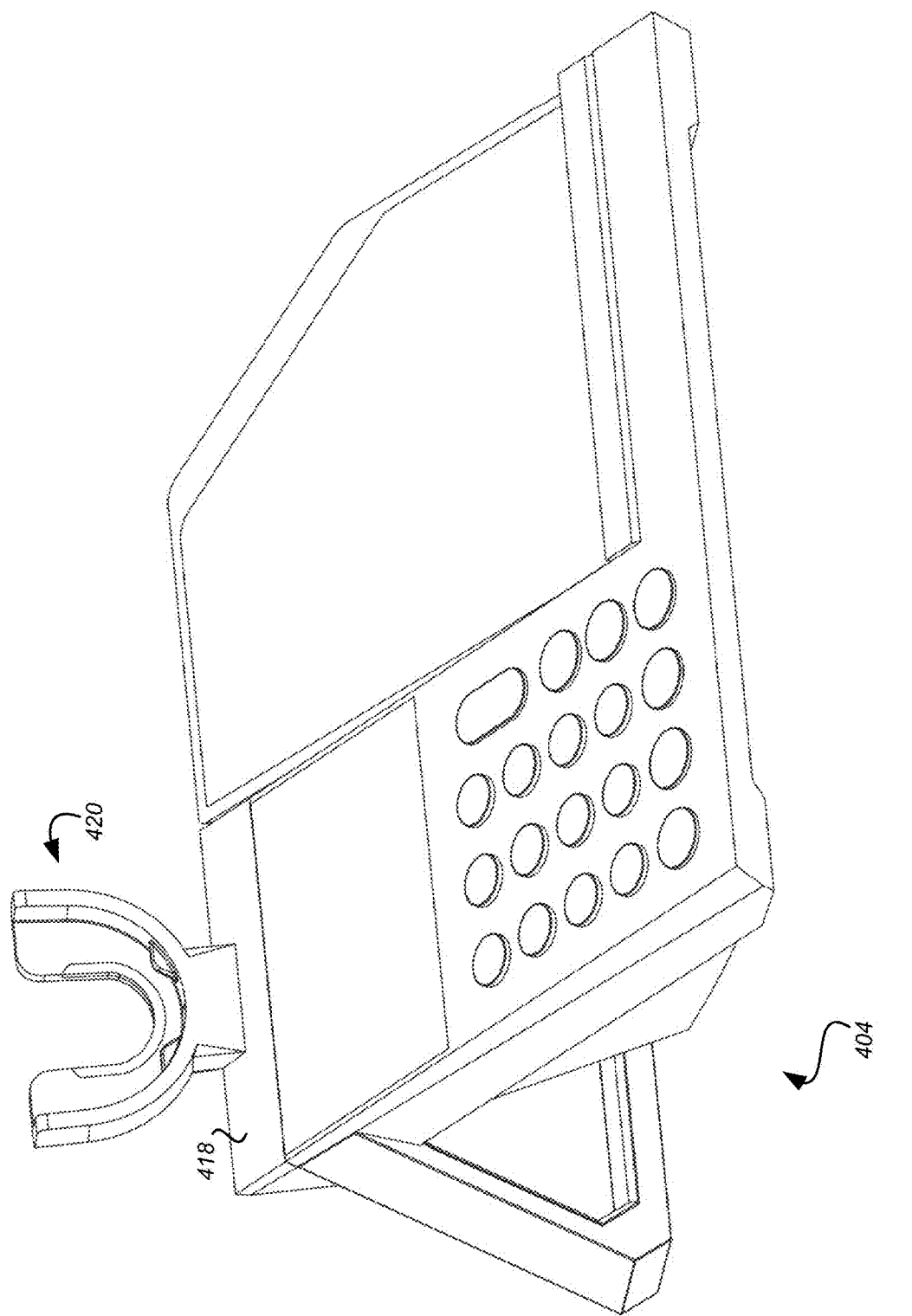
FIG. 4 shows a perspective view of a mobile phone station, in accordance with one or more embodiments of the invention.

FIG. 4 shows a mobile phone station 404, according to one or more embodiments. Although the elements of mobile phone station 404 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 4 may be omitted, repeated, and/or substituted. Accordingly, various embodiments may lack one or more of the features shown. For this reason, embodiments of the invention should not be considered limited to the specific arrangements of elements shown in FIG. 4.

The mobile phone station 404 of FIG. 4 is similar to the mobile phone station 304 described above, in the context of FIGS. 3A-3C. In addition to the features described above in reference to the mobile phone station 304, the mobile phone station 404 includes a headset cradle 420. In one or more embodiments, the headset cradle 420 includes a structure that physically supports a headset. In one or more embodiments, the headset cradle 420 includes one or more electrical contacts configured to mate with the electrical contacts of a headset. Accordingly, the cradle 420 may include one or more structures configured to support (i.e., dock, hold, etc.) a headset such that the electrical contacts of the cradle 420 and the headset are communicatively coupled. In this way, data and/or power may be conveyed between the headset and the mobile phone station 404.

Different headsets (e.g., different models, different wearing styles, etc.) may be associated with different cradles. For example, a cradle adapted to hold an over-the-ear style headset may not be suitable for holding an in-ear style headset. Accordingly, the cradle 420 may be removably attached to the mobile phone station 404 to allow users to switch between headsets. In one or more embodiments, the cradle 420 may be removably attached to a top cap 418 of the housing of the mobile phone station 404. In one or more embodiments, the cradle 420 and the top cap 418 may be a single unitary piece, such that exchanging the cradle 420 with a different cradle requires removal of the top cap 418.

Figure 5:
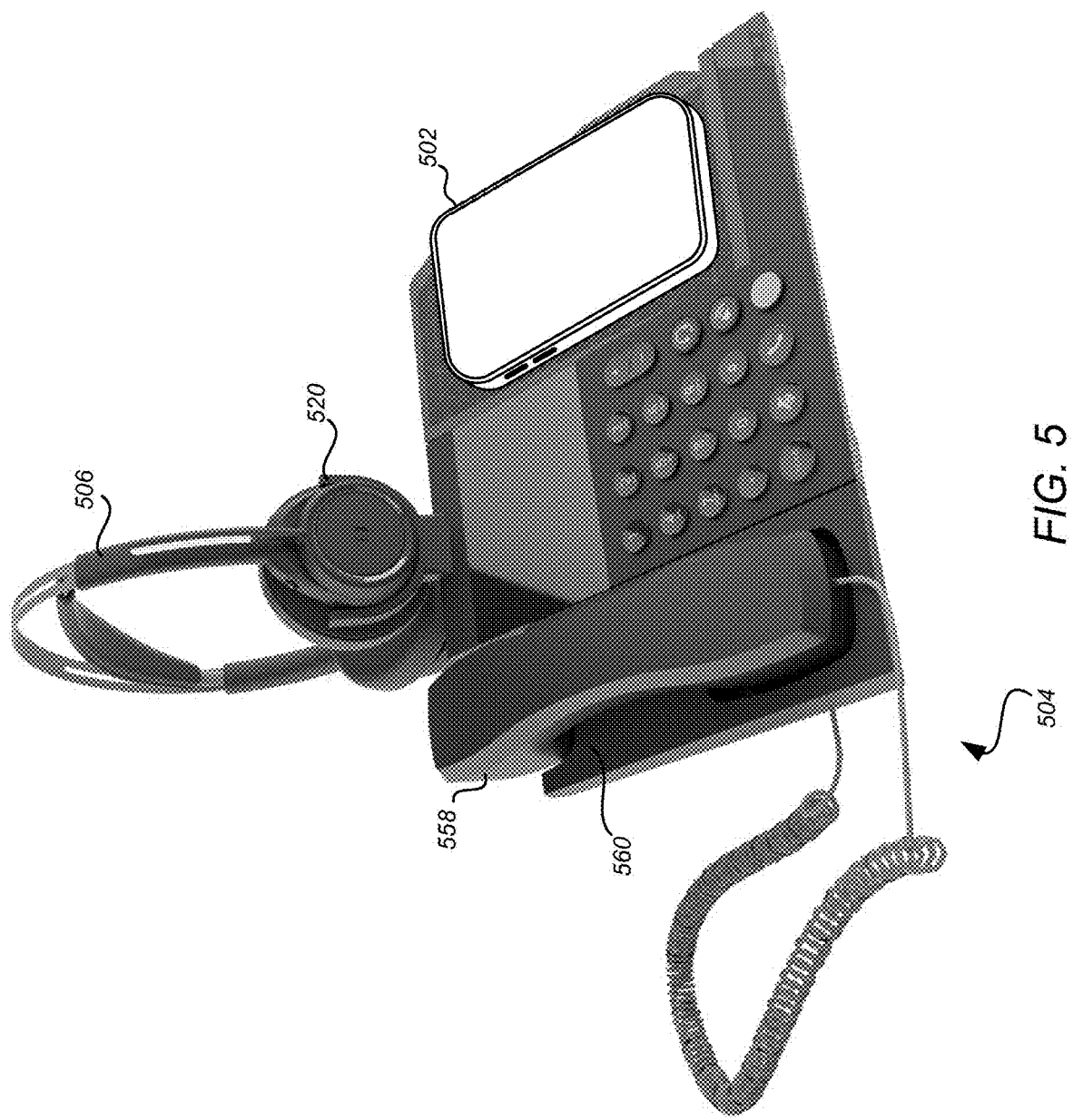
FIG. 5 shows a perspective view of a mobile phone station, according to one or more embodiments of the invention.

FIG. 5 shows a mobile phone station 504, according to one or more embodiments. Although the elements of mobile phone station 504 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 5 may be omitted, repeated, and/or substituted. Accordingly, various embodiments may lack one or more of the features shown. For this reason, embodiments of the invention should not be considered limited to the specific arrangements of elements shown in FIG. 5.

The mobile phone station 504 of FIG. 5 is similar to the mobile phone station 304 described above, in the context of FIGS. 3A-3C. In addition to the features described above in reference to the mobile phone station 304, the mobile phone station 504 includes a headset cradle 520, a handset 558, and a hookswitch 560 configured to detect removal and replacement of the handset 558. In one or more embodiments, the hookswitch 560 may include a magnetic hookswitch. For example, a Hall-effect sensor may be used to detect removal and replacement of the handset 558 at the mobile phone station 504. The hookswitch 560 may allow a user to end a call (i.e., hang up) by replacing the handset 558 on the mobile phone station 504, in addition to by way of a call control button on the mobile phone station 504.

As depicted in FIG. 5, a wireless headset 506 is docked in the cradle 520. Also, as depicted in FIG. 5, a smartphone 502 has been placed on a wireless charging platform of the mobile phone station 504. Accordingly, the smartphone 502 may be charging while also communicating over a wireless link with the mobile phone station 504. As a result, a user may make calls from and receive calls at the smartphone 502, while using the headset 506, the handset 558, or a speakerphone of the mobile phone station 504 as the all audio endpoint; as well as easily switch between such audio endpoints during the call.

Figure 6:
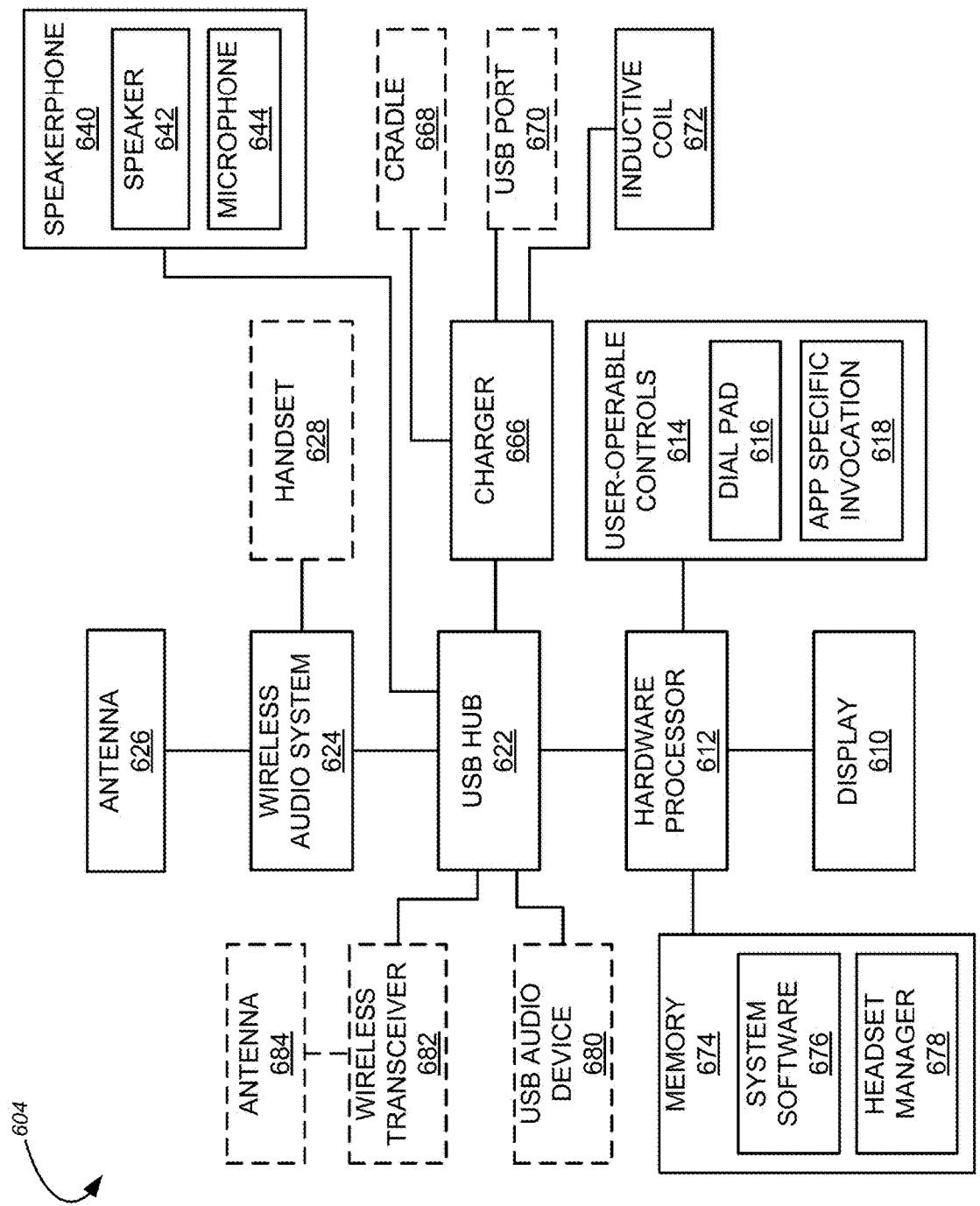
FIG. 6 depicts a system block diagram of a mobile phone station, in accordance with one or more embodiments of the invention.

FIG. 6 depicts a system block diagram of a mobile phone station 604, in accordance with one or more embodiments of the invention. Although the elements of the mobile phone station 604 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 6 may be omitted, repeated, and/or substituted. Accordingly, various embodiments may lack one or more of the features shown. For this reason, embodiments of the invention should not be considered limited to the specific arrangements of elements shown in FIG. 6.

The mobile phone station 604 of FIG. 6 is shown to include a hardware processor 612 operably coupled to a memory 674, a display 610, and user operable controls 614. Also, the hardware processor 612 is operably coupled, via a USB hub 622, to a wireless audio system 624 and accompanying antenna 626, a charger 666, and USB speakerphone 640. The charger 666 is coupled to, at least, an inductive coil 672. The elements of the mobile phone station 604 shown in FIG. 6 may remain in communication over one or more communication busses.

The memory 674 includes any storage device capable of storing information temporarily or permanently. The memory 674 may include volatile and/or non-volatile memory, and may include more than one type of memory. For example, the memory 674 may include one or more of SDRAM, ROM, and flash memory. As depicted in FIG. 6, the memory stores system software 676 and a headset manager 678.

The system software 676 includes any software that communicates with a smartphone and/or a headset connected to the mobile phone station 604. In one or more embodiments, the system software 676 may include a session-layer communication service for routing messages between devices, including session initiation, sending/receiving commands, reading/writing settings, and/or event reporting. In one or more embodiments, the system software 676 may include Bluetooth protocols and/or audio codecs. In one or more embodiments, the system software 676 may include libraries for real-time, high-bandwidth message passing and data marshalling. In one or more embodiments, the system software 676 may perform call audio endpoint switching responsive to user manipulation of some of the user-operable controls 614 (e.g., a speakerphone button, a headset button, etc.). Accordingly, the system software 676 may translate user manipulation of the user-operable controls 614 into commands that are sent to the appropriate connected devices.

The headset manager 678 includes any software specifically configured to interact with a headset connected to the mobile phone station 604. In one or more embodiments, the headset manager 678 may be configured to collect data from a headset connected to the mobile phone station 604. Such data may be reported back to a user, by way of the display 610 or a connected smartphone, via the system software 676. Such data may include, for example, a headset battery level, a headset identifier, call metrics, and acoustic events. As an option, the connected smartphone may forward the received data to a remote server over a network. In one or more embodiments, the headset manager 678 may be configured to write settings to the headset connected to the mobile phone station 604. The settings may include, for example, a call audio quality setting (e.g., narrowband, wideband, etc.), ringer preferences, volume preferences, etc. Such settings may be generated responsive to commands originating from a user, at the user-operable controls 614 or a connected smartphone, via the system software 676. In other words, the headset manager 678 may reside at a layer between the system software 676 and a connected headset. In this way the headset manager 678 may be updated independent of the system software 676, to accommodate the release of new headsets or new headset capabilities. In one or more embodiments, the headset manager 678 may be configured to perform device firmware updates of headsets connected to the mobile phone station 604. Such firmware updates may be received via a connected smartphone. In one or more embodiments, the system software 676 may be updated using an externally connected device. For example, a connected smartphone, or memory device coupled to the USB hub 622, may provide updates to the system software 676.

The hardware processor 612 processes data, including the execution of software, such as the system software 676 and the headset manager 678, stored in the memory 674. In one or more embodiments, the hardware processor 612 is a high performance, highly integrated, and highly flexible systemon-chip (SOC). In one or more embodiments, the hardware processor 612 may include a variety of processors (e.g., digital signal processors, etc.), analog-to-digital converters, digital-to-analog converters, etc., with conventional CPUs being applicable.

The display 610, any element that outputs a visual representation of a state of the mobile phone station 604, a connected headset, and/or a connected smartphone, as described above in reference to FIGS. 3A-3C and 8A-8B.

The user-operable controls 614 are shown to include a dial pad 616 (i.e., numerals 0-9, *, and #), and an application-specific invocation button 618. In one or more embodiments, the user-operable controls 614 may include one or more of a mute button and a call button. In one or more embodiments, the user-operable controls 614 may include a headset button and/or a speakerphone button. The system software 676 may respond to user operation of these buttons by selectively switching audio to a suitable local device (i.e., a connected headset, the speakerphone 640, respectively). The application-specific invocation button 618, when operated by a user, may result in the generation and transmission of a message to a connected smartphone. The message may request that an application be opened at the smartphone. In response to receiving such a message, the smartphone may open the application for the user.

In one or more embodiments, the user-operable controls may include a voice skills button, as described hereinabove. The voice skills button, when operated by a user, may result in the generation and transmission of a message to a connected smartphone. In response to receiving such a message, the smartphone may open a local voice assistant application. Further, the voice skills button, when operated by the user, may open an audio path between a microphone of a connected headset, or the speakerphone microphone 644, to the voice assistant executing on the smartphone. In this way, a user may issue voice commands to his/her smartphone without speaking into a microphone of the smartphone. As an option, the mobile phone station 604 may include an always listening mode, in which the station 604 listens for user-spoken keywords and/or commands without the user first physically manipulating a voice skills control.

The USB hub 622 serves as a modular interface to the hardware processor 612, and, accordingly, may relay input/output to and from the hardware processor 612 and other components of the mobile phone station 604, such as the wireless audio system 624. In one or more embodiments, the mobile phone station 604 may include a USB audio device 680 and/or a wireless transceiver 682 (and accompanying antenna 684) communicatively coupled to the USB hub 622. The wireless transceiver 682 may be, for example, a DECT transceiver, a Wi-Fi transceiver, or a Bluetooth transceiver. The antenna 684 converts electric power into radio waves under the control of the wireless transceiver 682, and intercepts radio waves which it converts to electric power and provides to the wireless transceiver 682. Accordingly, via the wireless transceiver 682 and the antenna 684, the mobile phone station 604 may form a wireless communications link (i.e., connect) with a wireless headset. In one or more embodiments, a USB audio device 680 may be coupled to the USB hub 622 via an externally-accessible USB port (i.e., a wired communications link). The USB audio device 680 may include a USB headset including a headset speaker and a headset microphone.

The wireless audio system 624 includes wireless transceiver (e.g., Bluetooth transceiver, Wi-Fi transceiver, etc.) configured to form a wireless communications link with a smartphone. In one or more embodiments, the wireless audio system 624 may include a flash programmable audio system on a chip. Accordingly, the wireless audio system 624 may include a digital signal processor, audio codec, digital audio interface, I$^2$C interface, USB interface, audio digital-to-analog converter, and/or audio analog-to-digital converter. The antenna 626 converts electric power into radio waves under the control of the wireless audio system 624, and intercepts radio waves which it converts to electric power and provides to the wireless audio system 624. Accordingly, via the wireless audio system 624 and the accompanying antenna 626, the mobile phone station 604 may form a wireless communications link with a smartphone.

As an option, the mobile phone station 604 may include a handset 628 communicatively coupled to the wireless audio system 624.

Still referring to FIG. 6, the charger 666 is shown communicatively coupled to the USB hub 622 and an inductive coil 672. As an option, the mobile phone station 604 may include a headset cradle 668 and/or USB port 670 communicatively coupled to the charger 666. The charger 666 is configured to provide a charging voltage to one or more secondary charging devices. The secondary charging devices include the headset cradle 668, the USB port 670, and/or the inductive coil 672. Each of the secondary charging devices may receive a different charging voltage from the charger 666. Accordingly, when a wireless headset is placed in a headset cradle 668 of the mobile phone station 604, a battery of the headset may be charged by the cradle 668. Similarly, the USB port 670 may include a USB receptacle (e.g., USB Type-A receptacle, USB Type-C receptacle, a micro-USB receptacle, etc.), to which a first end of a USB cable may be inserted. Further, a second end of the USB cable may be connected to a portable electronic device, such as a smartphone, for charging a battery of the portable electronic device. Still yet, the inductive coil 672 is configured to wirelessly charge a portable electronic device, such as a smartphone, through inductive coupling. The inductive coil 672 may be installed within a pivoting platform of the mobile phone station 604, allowing the portable electronic device to wirelessly charge while remaining available for user operation and viewing. In one or more embodiments, two or more different inductive coils 672 may be included in the platform, to facilitate the wireless charging of devices of varying geometries and orientations (e.g., portrait, landscape, etc.). In other words, the mobile phone station 604 provides a user with the ability to charge his/her headset, while also charging his/her smartphone either wirelessly or using a cable plugged into the mobile phone station 604.

The USB speakerphone 640 includes a loudspeaker 642 and microphone 644. The speakerphone 640 outputs and receives call audio without requiring the user don a headset or pick up a handset 628. In one or more embodiments, the speakerphone 640 comprises a full duplex speakerphone.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. A mobile phone station, comprising:
   a hardware processor;
   a memory, a display, user-operable controls, and a Universal Serial Bus (USB) hub communicatively coupled to the hardware processor;
   a wireless audio system, and accompanying antenna, communicatively coupled to the USB hub, the wireless audio system configured to form a wireless communications link with a smartphone;
   a speakerphone, the speakerphone including a loudspeaker and a microphone located on a bottom of the mobile phone station, and wherein a foot disposed on the bottom of the mobile phone station is configured to isolate, at least in part, the microphone from direct sound output of the loudspeaker;
   a charger communicatively coupled to the USB hub; and
   an inductive coil configured to receive a charging voltage from the charger for wirelessly charging the smartphone.

2. The mobile phone station of claim 1, further comprising a wireless transceiver configured to form another wireless communications link with a wireless headset.

3. The mobile phone station of claim 1, further comprising an externally-accessible USB port configured for receiving a USB headset.

4. The mobile phone station of claim 1, wherein the user-operable controls include a dial pad.

5. The mobile phone station of claim 1, wherein the user-operable controls include an application-specific invocation button.

6. The mobile phone station of claim 1, further comprising a headset cradle.

7. The mobile phone station of claim 6, wherein the headset cradle includes one or more electrical contacts configured to charge a battery of a wireless headset.

8. The mobile phone station of claim 1, wherein the memory includes software operable to cause the smartphone to make and receive calls responsive to operation of the user-operable controls.

9. The mobile phone station of claim 1, further comprising a pivoting platform, wherein the inductive coil is installed within the pivoting platform.

10. The mobile phone station of claim 1, wherein the user-operable controls include a button for selectively toggling between outgoing call methods at the smartphone.

11. A mobile phone station, comprising:
    a hardware processor;
    a charger configured to provide a charging voltage to one or more secondary charging devices;
    user-operable controls;
    a speakerphone, the speakerphone including a loudspeaker and a microphone located on a bottom of the mobile phone station, and wherein a foot disposed on the bottom of the mobile phone station is configured to isolate, at least in part, the microphone from direct sound output of the loudspeaker;
    an audio system communicatively coupled to the speakerphone and a headset, the audio system configured to form a wireless communications link with a smartphone;
    a display configured to indicate a charge state of the smartphone when the smartphone is receiving power from the one or more secondary charging devices;
    a headset cradle configured to receive and support the headset; and
    a memory storing instructions for execution by the hardware processor, the instructions including:
        software for communicating with the smartphone,
        software for performing call audio endpoint switching between the speakerphone and the headset responsive to user manipulation of the user-operable controls, and
        software for writing settings to the headset.

12. The mobile phone station of claim 11, wherein the user operable controls include a speakerphone button and a headset button.

13. The mobile phone station of claim 11, wherein the software for writing settings to the headset includes software for performing a firmware update of the headset.

14. The mobile phone station of claim 11, comprising a pivoting platform configured to support the smartphone.

15. The mobile phone station of claim 14, wherein the one or more secondary charging devices includes an inductive coil for wirelessly charging the smartphone.

16. The mobile phone station of claim 11, wherein the one or more secondary charging devices includes the headset cradle.

17. The mobile phone station of claim 11, wherein the one or more secondary charging devices includes a USB port.

* * * * *